(12) United States Patent
Asbe et al.

(10) Patent No.: US 10,902,403 B2
(45) Date of Patent: Jan. 26, 2021

(54) ELECTRONIC PAYMENT SYSTEM AND METHOD THEREOF

(71) Applicant: National Payments Corporation of India, Mumbai (IN)

(72) Inventors: Dilip Asbe, West Mumbai (IN); Narayanan Rajendran, Hyderabad (IN); Sateesh Palagiri, Kadapa (IN); Anubhav Sharma, Mumbai (IN)

(73) Assignee: National Payments Corporation of India, Mumbai (IN)

( * ) Notice: Subject to any disclaimer, the term of this patent is extended or adjusted under 35 U.S.C. 154(b) by 77 days.

(21) Appl. No.: 16/307,367

(22) PCT Filed: May 12, 2017

(86) PCT No.: PCT/IB2017/052793
§ 371 (c)(1),
(2) Date: Dec. 5, 2018

(87) PCT Pub. No.: WO2017/221085
PCT Pub. Date: Dec. 28, 2017

(65) Prior Publication Data
US 2019/0303910 A1    Oct. 3, 2019

(30) Foreign Application Priority Data

Jun. 22, 2016   (IN) .............................. 201621021488

(51) Int. Cl.
*G06Q 20/40* (2012.01)
*G06Q 20/02* (2012.01)
(Continued)

(52) U.S. Cl.
CPC ......... *G06Q 20/3221* (2013.01); *G06Q 20/08* (2013.01); *G06Q 20/10* (2013.01);
(Continued)

(58) Field of Classification Search
CPC ..... G06Q 20/3221; G06Q 20/10; G06Q 20/22
(Continued)

(56) References Cited

FOREIGN PATENT DOCUMENTS

| IN | 201502256 | 11/2015 |
|---|---|---|
| WO | 2013101297 | 7/2013 |
| WO | 2015175696 | 11/2015 |

OTHER PUBLICATIONS

"Unified Payment Interface: API and Technolgoy Specifications—Version 1.7" (NPCI), Jan. 2016 (Jan. 2016), https://www.npci.org.in/sites/default/files/UPI-PG-17_01_31_RBI_Final%20version%201.7.pdf (Year: 2016).*
(Continued)

*Primary Examiner* — Hai Tran
(74) *Attorney, Agent, or Firm* — Sand, Sebolt & Wernow Co., LPA

(57) ABSTRACT

The present disclosure envisages an electronic payment system and method. This disclosure relates to the field of electronic payment systems. The electronic payment system facilitates sending and receiving money in a simpler manner using user devices. It provides a unified payments interface (UPI) and enables users to push and pull/collect payments from accounts of concerned persons/entities. The system of the present disclosure enables payment transactions between a payer and a payee without mandatorily needing bank information and bank account details of each other. It eliminates the risk of storing customer's account details and can be used by customers which do not have credit/debit cards. It provides payment transaction privacy and facilitates multiple utility, cash on delivery, bill splitting/sharing, merchant payments/remittances. The electronic payment system of the present disclosure works across various interfaces, where payment requests can be generated on a web interface and authorized on a mobile interface (application tool).

8 Claims, 9 Drawing Sheets

(51) Int. Cl.
*G06Q 20/32* (2012.01)
*G06Q 20/10* (2012.01)
*G06Q 20/08* (2012.01)
*G06Q 20/38* (2012.01)
*G06Q 20/22* (2012.01)

(52) U.S. Cl.
CPC .......... *G06Q 20/102* (2013.01); *G06Q 20/22* (2013.01); *G06Q 20/32* (2013.01); *G06Q 20/38* (2013.01); *G06Q 20/385* (2013.01); *G06Q 20/4012* (2013.01); *G06Q 20/40145* (2013.01)

(58) Field of Classification Search
USPC .......................................................... 705/44
See application file for complete search history.

(56) References Cited

OTHER PUBLICATIONS

"Unified Payment Interface: API and Technolgoy Specifications—Version 1.0" (NPCI), Apr. 15, 2015 (Apr. 15, 2015), URL: http://npci.org.in/documents/Technical_Specifications.pdf, Chapers 1-4, pp. 5-32; Figures 4.1, 4.2.

* cited by examiner

Create VPA

User account number

12xxxxxxxx34

○ Registered VPAs

● Create new VPA

_____@xyz
Check availability

Suggested VPAs
○ 123@xyz
○ Abc1@xyz
☑ abc@xyz

☐ Default account to send payment
☐ Default account to receive payment

[ SUBMIT ]

FIGURE 8A

| UPI | |
|---|---|
| Transact | |
| Pay to VPA | > |
| Collect from VPA | > |
| Pay using QR code | > |
| UPI transaction history | > |
| Manage | > |

FIGURE 8B

| Pay to VPA |
|---|
| Payer VPA |
|    abc@xyz |
| Payee VPA |
| |
| Enter amount |
| |
| Remarks |
| |
| SUBMIT |

FIGURE 8C

| Collect from VPA |
|---|
| Receive funds on VPA |
|    abc@xyz |
| Collect from VPA |
| |
| Enter amount |
| |
| Remarks |
| |
| ○ Collect now |
| ○ Collect later |
| SUBMIT |

FIGURE 8D

| Manage |
|---|
| Create VPA |
| Modify VPA |
| Delete VPA |

FIGURE 8E

ELECTRONIC PAYMENT SYSTEM AND METHOD THEREOF

FIELD

The present disclosure relates to electronic payment systems.

Definitions

The expression 'registered user' used hereinafter in the specification refers to a person using the electronic payment system (EPS) of the present disclosure for electronic payment transactions. The registered user can be a payer i.e. a person who wants to Send/Pay money using the EPS, or can be a payee i.e. a person who receives/collects money using the EPS.

The expression 'user device' used hereinafter in the specification refers to a device, used by a registered user, wherein the user device includes but is not limited to a mobile phone, a laptop, a tablet, an iPad, a PDA, a notebook, a net book, a smart device, a smart phone, a personal computer, a handheld device and the like.

The expression 'payment transactions' used hereinafter in the specification refers to financial as well as non-financial transactions. The financial transactions comprise collect/pull requests, pay/push requests, and merchant payments. The non-financial transactions include but are not limited to mobile banking registration, generation of one time password (OTP), checking balance, setting or changing PIN, logging a complaint, and checking transaction status.

The expression 'Payment Service Provider System (PSPS)' used hereinafter in the specification refers to a Bank, Payment Bank, or any other centrally and/or Government regulated entity that is allowed to acquire customers and provide payment (credit/debit) services to the customers (individuals or entities), The PSPS provides respective application tools that can be accessed by registered users on their user devices to push or pull payments. The PSPS provides a tool for electronic processing of financial and non-financial transactions The expression 'sender' used hereinafter in the specification refers to a registered user which sends a request to pay/push or collect/pull money using the user device of the present disclosure. A sender can be a payer or a payee.

The expression 'receiver' used hereinafter in the specification refers to a registered user which receives a request on a user device to collect/pull or pay/push money using the user device of the present disclosure. A receiver can be a payee or a payer.

The expression 'unique ID' or "virtual payment address (VPA)" used hereinafter in the specification refers to a unique identifier, associated with the registered user. The unique ID or virtual Payment address (VPA) is used to carry out payment transactions. This can be created by a registered user for a payment transaction(s).

The expression 'unified payments interface (UPI)' used hereinafter in the specification refers to an interface system that provides interface between PSPSs for financial and non-financial transactions including payment transactions and payment settlements.

The expression 'Payment Service Provider Application (PSPA)' used hereinafter in the specification refers to an application tool provided by each PSPS. The PSPA tool may be provided on a web portal or play store and/or mobile web or through other means to interface with the PSPS through the UPI.

The expression 'user information data' used hereinafter in the specification refers to data related to a registered user, including the registered user's VPA, account details and other non-financial details. The user information data is used to authenticate the registered user.

These definitions are in addition to those present in art.

BACKGROUND

In recent years, financial transactions have been increasingly carried out using handheld devices i.e. feature phones and smart phones. Various payment techniques using handheld devices are currently available. These payment techniques require knowledge of a payee's account number and additional details related to the payee's bank. In case of online payments, a payer is required to go to his bank web portal with the help of internet banking or mobile banking in order to carry out financial transactions. To this date, many users are still not comfortable with online financial transactions/electronic transactions, as the bank web portals for internet banking or mobile banking are not user friendly or are complex in operation and consume time during data input and authorization.

In some cases, a payee's mobile phone number is used to make a payment. However, in such a technique, it is imperative for a payer to know the payee's bank details and/or mobile phone number as the mobile banking is based on a SIM number. In all such transaction cases, payment is pushed by the payer to the payee. The payee is solely dependent on the payer for transactions and the payer is dependent on his bank web portal for the payment services. Some users tend to change their mobile/phone numbers frequently and in such cases, it is difficult for a payer to keep track of these changes. Additionally, in some cases, the payer and the payee may not want to reveal their bank details and personal details to each other.

Accordingly, there is a need to limit the aforementioned drawbacks and provide an efficient, simplified and user friendly system and method for carrying out electronic payment transactions.

OBJECTS

Some of the objects of the present disclosure, which at least one embodiment herein satisfies, are as follows:

It is an object of the present disclosure to ameliorate one or more problems of the prior part or to at least provide a useful alternative.

An object of the present disclosure is to provide an electronic payment system that is easy to use.

Another object of the present disclosure is to provide an electronic payment system having a unified payments interface (UPI).

Yet another object of the present disclosure to provide an electronic payment system which enables users to pull/collect payments from accounts of concerned persons/entities, subsequent to the requested entity authorizing such payments.

Still another object of the present disclosure is to simplify the electronic payment system for both, the payers and the payees by reducing authorization steps and increasing security features.

A further object of the present disclosure is to provide an electronic payment system that enables payment transactions between a payer and a payee without mandatorily needing the bank information and bank account details of each other.

Furthermore, an object of the present disclosure is to provide an electronic payment system that enables a user to send and receive money with the help of a virtual payment address.

Yet another object of the present disclosure is to provide an electronic payment system that eliminates dependency of a user on his bank web portal or mobile application for internet or mobile banking, and allows the user to use a different bank web portal and/or mobile applications for payment transactions other than his bank account.

Other objects and advantages of the present disclosure will be more apparent from the following description, which is not intended to limit the scope of the present disclosure.

SUMMARY

An electronic payment system (EPS) and method is envisaged for facilitating payment transactions between a plurality of users. The system comprises a main storage device, an operating processor, a plurality of Payment Service Provider system (PSPSs) configured to register users and further configured to be registered with the EPS, a plurality of user devices, Payment Service Provider Application tools (PSPAs), and a Unified Payment Interface (UPI). The main storage device stores a set of pre-determined rules which are used by the operating processor to obtain a set of system operating commands. Each PSPS comprises a local storage device that stores user information data relating to users registered with the PSPS, at least one look up table that facilitates matching data inputted by a customer, a user information data and a registered user, and a PSPS server. Each user device of the plurality of user devices is associated with one of the registered users and registered as a part of user information data. Each PSPA tool is associated with and hosted by a PSPS server of a PSPS registered with the EPS and has elements which are downloadable and storable in the user device of a registered user irrespective of the fact that the registered user is registered with the PSPS associated with the PSPA tool or not. Each PSPS tool facilitates generation and receipt of transactional data signals relating to payment requests from the registered users, and credit and/or debit accounts of the registered users based on the requests. The downloadable elements of each PSPA tool comprise a registering module and a virtual payment address (VPA) creator module. The registering module permits registration of a user device with a registered PSPS associated with a PSPA tool in a one to one correspondence. The VPA creator module enables a registered user to create a unique VPA which includes identification of the PSPS in which the registered user is registered, and further enables a user device to transmit the unique VPA to the local storage device of the PSPS in which the user is registered, as part of the registered user's user information data. The UPI facilitates registration of a PSPS with the EPS, and further facilitates controlled movement of transactional data signals selectively between PSPSs, to effect payment from one registered user to another registered user in same or different PSPSs. The UPI comprises a settlement module which cooperates with the plurality of PSPSs to periodically collate credit and debit transactions, and generate net credit and debit instructions between the registered PSPSs.

BRIEF DESCRIPTION OF THE ACCOMPANYING DRAWING

The electronic payment system and a method thereof of the present disclosure will now be described with the help of the accompanying drawing, in which:

FIGS. 8A, 8B, 8C, 8D, and 8E illustrate different screens displayed on a registered user device using a PSPA tool of the EPS of FIG. 1.

Figure 1:
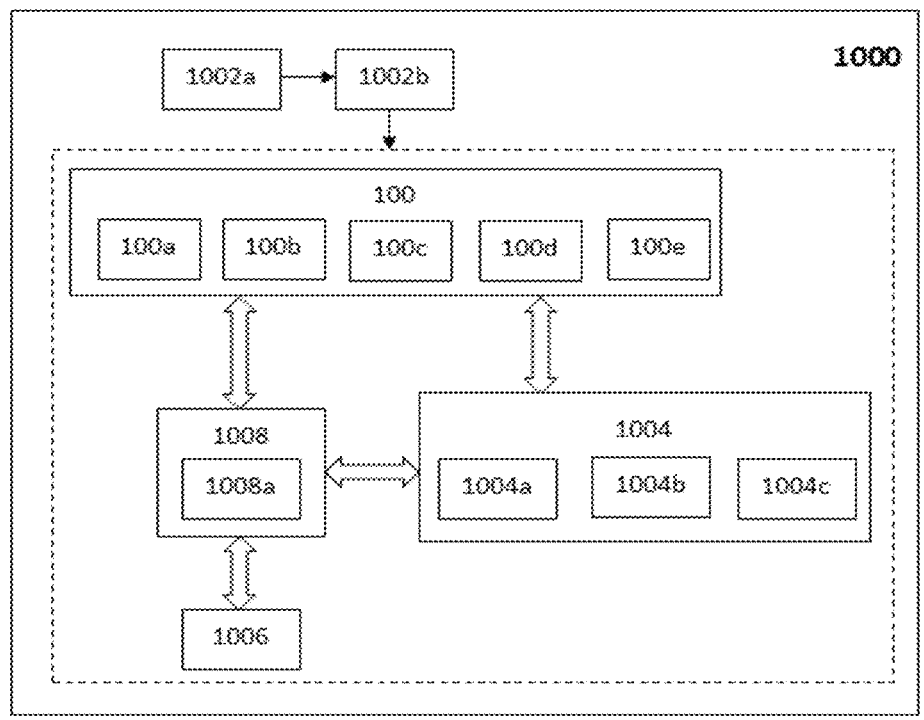
FIG. 1 illustrates a schematic block diagram of an electronic payment system (EPS) in accordance with an embodiment of the present disclosure.

List and details of reference Numerals used in the description and drawing:

| Reference Numeral | Reference |
|---|---|
| 1000 | Electronic payment system (EPS) |
| 100, 500, 600, 700 | Unified Payments Interface (UPI) |
| 100a | Settlement module |
| 100b | Receiver |
| 100c | Parser |
| 100d | Extractor identifier |
| 100e | Transmitter |
| 1002a | Main storage device |
| 1002b | Operating processor |
| 1004 | Payment Service Provider System (PSPS) |
| 1004a | Local storage device |
| 1004b | At least one look up table |
| 1004c | PSPS server |
| 1006 | User device |
| 1008 | Payment Service Provider Application (PSPA) tool |
| 1008a | Registering module |
| 1008b | Virtual payment address (VPA) creator module |
| 102, 502, 702 | Payee's user device |
| 104, 504, 604 | Payer's user device |
| 106, 506, 606 | Payee's PSPS |
| 108, 508, 608 | Payer's PSPS |
| 110, 510, 610, 706 | Remitter/Issuer/Payer's bank |
| 112, 512, 612, 708 | Beneficiary/Acquirer/Payee's bank |
| 704 | Merchant/Customer PSPS (common PSPS) |
| 710 | Customer |

DETAILED DESCRIPTION

The disclosure will now be described with reference to the accompanying drawing which illustrate and do not limit the scope and ambit of the disclosure. The description provided is purely by way of example and illustration.

Few years back, bank account holders were allowed to use their debit/ATM cards only at the bank authorized ATM machines that belonged to the account holder's bank, for money transactions. With increasing requirements of the bank users, clients and customers, a new model was envisaged by which access to ATMs was widened enabling the bank account holders to use ATMs operated by any bank. Nowadays, any person can use any ATM worldwide irrespective of his specific bank. This facilitates universal inter-portability between bank ATMs and debit/ATM cards through various networks operating to provide for transaction processing & settlement of funds between the transacting parties.

The present disclosure addresses interoperability of banking mobile applications and/or bank web-portals for payment transactions. Using the system of the present disclosure, users and/or bank customers are not restricted to use the web-portals and/or mobile-webs of the banks in which they have their account(s). Instead, the users (both payer and payee) and/or customers can choose any bank's web-portal or mobile-web for their payment transactions without knowing bank account details of other user/person. The users (payer or payee) are required to know only a unique ID or virtual payment address (VPA) to make financial/electronic payment transactions.

Referring to the accompanying drawing, FIG. 1 illustrates a schematic block diagram of an electronic payment system (1000) (hereinafter referred to as EPS) for facilitating payment transactions between a plurality of users. The payment transactions include financial as well as non-financial transactions, wherein the financial transactions comprise collect/pull requests, pay/push requests, and merchant payments, and the non-financial transactions comprise mobile banking registration, generation of one time password (OTP), setting or changing PIN, checking transaction status, log a complaint and the like.

The EPS (1000) comprises a main storage device (1002a), an operating processor (1002b), a plurality of Payment Service Provider systems (PSPSs), a plurality of user devices, Payment Service Provider Application (PSPA) tools, a Unified Payment Interface (UPI) (100).

The main storage device (1002a) is configured to store a set of pre-determined rules. The main storage device (1002a) may include any computer-readable medium known in the art including, for example, volatile memory, such as static random access memory (SRAM) and dynamic random access memory (DRAM), and/or a non-volatile memory, such as read only memory (ROM), erasable programmable ROM, flash memories, hard disks, optical disks, and magnetic tapes, and/or a cloud based storage (cloud storage). In an embodiment, the main storage device (1002a) is configured to store predetermined rules related to electronic payment transactions, transmitting and receiving payment requests, and the like.

The operating processor (1002b) is configured to cooperate with the main storage device (1002a) to receive and process the pre-determined rules to obtain a set of system operating commands. The operating processor (1002b) may be implemented as one or more microprocessors, microcomputers, microcontrollers, digital signal processors, central processing units, state machines, logic circuitries, and/or any devices that manipulate signals based on operational instructions. Among other capabilities, the operating processor (1002b) is configured to fetch and execute the predetermined set of rules stored in the main storage device (1002a) to control modules of the EPS 1000.

The plurality of Payment Service Provider systems (PSPSs) register with the EPS (1000) and are configured to register users. Each PSPS (1004) comprises a local storage device (1004a), at least one look up table (1004b), and a PSPS server (1004c). The local storage device (1004a) stores user information data related to users registered with the PSPS (1004). In one embodiment, the user data includes a virtual payment address (VPA), account details, and other non-financial details of a registered user, to facilitate authentication of the registered user. The at least one look up table (1004b) facilitates matching data inputted by a customer, a user information data, and a registered user.

Each user device (1006), of the plurality of user devices, is associated with one of the registered users and is registered as a part of user information data. Each of the registered users uses a registered user device to generate transactional data signals relating to payments requests, via a PSPA tool.

Each PSPA tool (1008), of the PSPA tools, is associated with and hosted by a PSPS server (1004c) of a PSPS (1004) registered with said EPS (1000), and has elements which are downloadable and storable in the user device (1006) of a registered user irrespective of the fact that the registered user is registered with the PSPS associated with the PSPA tool (1008) or not. Each PSPA tool (1008) facilitates generation and receipt of transactional data signals relating to payment requests from said registered users, and credit and/or debit accounts of the registered users based on the requests. The downloadable elements of each PSPA tool (1008) comprise a registering module (1008a) and a virtual payment address (VPA) creator module (1008b). The registering module (1008a) permits registration of a user device (1006) with a registered PSPS (1004) associated with a PSPA tool (1008) in a one to one correspondence. The VPA creator module (1008b) enables a registered user to create a unique VPA which includes identification of the PSPS in which the registered user is registered, and further enables a user device (1006) to transmit the unique VPA to the local storage device (1004a) of the PSPS (1004) in which the user is registered, as part of the registered user's user information data.

The UPI (100) facilitates registration of a PSPS (1004) with the EPS (1000), and further facilitates controlled movement of transactional data signals selectively between PSPSs, to effect payment from one registered user to another registered user in same or different PSPSs. The UPI (100) comprises a settlement module (100a) which cooperates with the plurality of PSPSs to periodically collate credit and debit transactions, and generate net credit and debit instructions between the registered PSPSs. In an embodiment, the settlement module (100a) is a settlement server.

In order to facilitate the controlled movement of transactional data, the UPI (100) further comprises a receiver (100b), a parser (100c), an extractor (100d), and a transmitter (100e). The receiver (100b) receives transactional data signals relating to payment requests from the registered user devices via any of the PSPA tools. Each payment request comprises a VPA of a first registered user, a VPA of a second registered user, and a transaction amount, such that these VPAs include information related to PSPSs to which the first registered user and the second register user are registered. The parser (100c) parses the transactional data signals to obtain parsed signals. Information relating to the PSPS of the first registered user and the PSPS of the second registered user is then extracted and identified from the parsed signals by the extractor identifier (100d). The transmitter (100e) then transmits the transactional data signals to the identified respective PSPSs, to facilitate credit from or debit to an account of the first registered user to or from an account of the second registered user, selectively based on content of the parsed data signals.

Figure 2A:
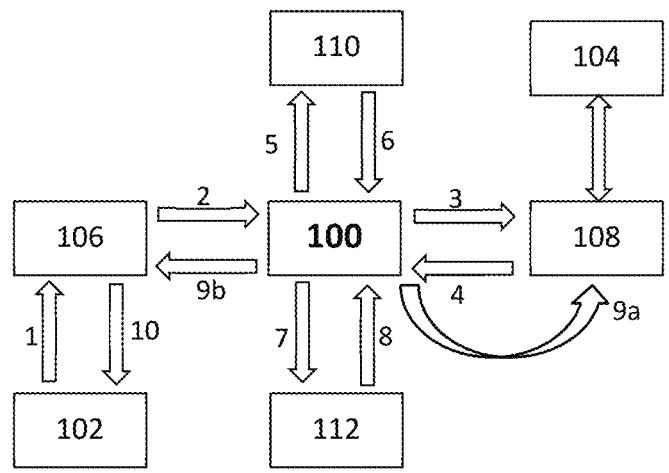
FIG. 2A illustrates a schematic diagram showing person to person transaction flow using the EPS in accordance with the embodiment of FIG. 1.
Figure 2B:
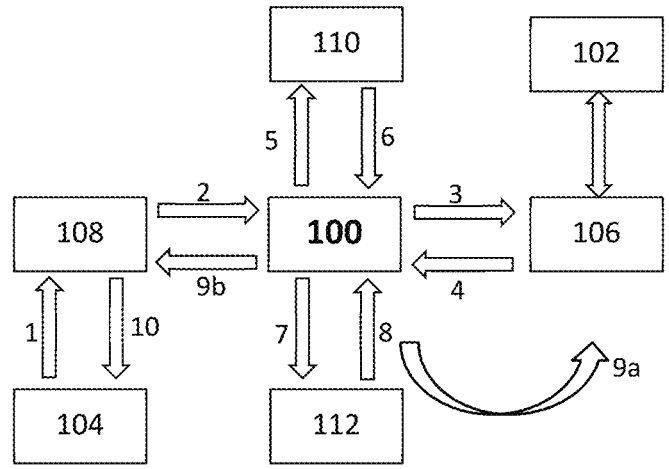
FIG. 2B illustrates a schematic diagram showing another person to person transaction flow using the EPS in accordance with the embodiment of FIG. 1.

FIGS. 2A and 2B of the accompanying drawing illustrate schematic diagrams showing person to person transaction flows using the UPI (100) for payment transactions. The UPI (100) is an interface having a plurality of servers.

In one embodiment, the UPI (100) has a transaction server, an authorization server, a UPI server, and a settlement server. The transaction server processes transactional data signals, the authorization server authorizes registered users, and the UPI server processes a stored set of rules for identifying registered PSPSs. The UPI (100) interfaces with the banks on the basis of instructions/request from the PSPSs originated through the PSPA tools. The UPI (100) carries out transaction processing and payment settlements. In an embodiment, the transaction processing is carried out with the help of the transaction server. The payment settlements among the banks and the PSPSs at the end of the day are done by using the settlement server. In one embodiment, the PSPS server hosts a PSPA tool which can be used by registered users to transmit payment requests. The payment requests can be pay/push request or collect/pull request.

The payment pull request is the one where a person/entity needs to collect payment from another person/entity. The payment push request is the one where a person/entity needs to pay a certain amount to another person/entity. In one embodiment, enabling steps in order to enable a user to push or pull payment, include the following;
a. Registering with a PSPS;
b. Registering for mobile banking and generating a UPI PIN for transactions (if not already registered);
c. Downloading a PSPA tool provided by any PSPS on a user device, and creating a profile for a registered user by providing account details with password/login PIN by using the PSPA tool;
d. Creating VPA as unique ID using the PSPA tool, such that VPA is associated to any of the details of the user's bank account(s), using the system of the present disclosure; and
e. Transmit push or pull payment requests/transactional data through the PSPA tool.

The PSPS is a bank which provides a PSPA tool and can be registered with the EPS (1000) to make use of the UPI (100). In the abovementioned step 'a' of 'registering with a PSPS', users register with a bank of their choice by opening an account in the bank. If a user already has an account in a bank he can register for mobile banking by providing necessary details including details of his user device, in order to register the user device. Once the registration is complete, the user can download PSPA tools as mentioned in step 'c' above. A user (for example, a payer or a payee) uses his user device to access a PSPA tool of his choice irrespective of whether he holds an account in the bank which provides the PSPA tool. In step 'd', the user is required to create a VPA. Screen for VPA creation is illustrated in FIG. 8A. As the user is registered with his bank, and provides details of the same to use the PSPA tool. The user account number is automatically displayed on the VPA creation screen of FIG. 8A. Thus, the user does not need to remember his account details. The user is then prompted to create new VPA or use VPAs registered by him (if he has done VPA creation previously).

In one embodiment, if the user is registered with a 'xyz' bank, his VPA has a suffix code '@xyz'. Rules for deciding suffix code for VPAs for particular PSPS are decided by the UPI (100) and/or the PSPS, which is stored in the UPI server and/or the PSPS server. So the VPA will have a username selected by the user with a suffix code associated to the PSPS to which the user is registered. Therefore, in case of 'abc@xyz', 'abc' is a unique name/User name selected by the user and 'xyz' is the name of the user's PSPS. Other examples include Unique name@HDFC, Unique name@SBI, Unique name@Corporation, Unique name@PNB, etc. The user's PSPS then stores details of his VPA and other non-financial details created using the PSPA tool in the local storage device of the PSPS. In an embodiment, the user registers to at least one bank with account details like user account name, account number, Aadhaar number, IFSC code, and the like using the PSPA tool, which is necessary for identifying the user's bank account to carry out payment transactions. On successful creation of the VPA, the user can use the VPA while transmitting push or pull payment requests/transactional data through the PSPA tool. Further, the user can also use Account Number along with the IFSC, Aadhaar number, Aadhaar number +IIN and Mobile number, and MMID, or just his mobile number (if and as & when included) for payment by the UPI (100).

After completion of the registration and VPA creation process, the users (payers and payees) have respective VPAs. The payer or payee uses the VPAs/unique IDs, without knowing bank names or bank account details of another person, for carrying out payment transactions. The VPA and bank details of all users are maintained by the respective local storage devices and processed by respective PSPS servers, and are not to be shared by the UPI (100).

The payment transactions include collect transactions (collect request) and pay transactions (pay request). The PSPA tool provides different options to a registered user, on display screen of his user device, to carry out payment transactions, as illustrated in FIG. 8B. The user can select any of the pay to VPA, collect from VPA, pay using QR code, pay using account number with IFSC, pay to Aadhaar, pay to mobile number, to make or receive payments. The UPI (100) with help of the PSPA tool also facilitates the user to keep a track of his UPI transaction history. It also allows the user to manage the user's VPAs. If the user wishes to manage his VPAs, he can select the 'manage' option displayed on screen as illustrated in FIG. 8B, in response the screen of FIG. 8E is displayed to the user by his PSPA tool. The user can then choose to create a VPA, modify an existing VPA, or delete an existing VPA.

When a payee wants to collect money from a payer (i.e. Pull money or Collect transaction or Collect request) (FIG. 2A), the payee uses a payee's user device (102) to access and operate a PSPA tool to provide a VPA/unique ID of the payer along with the amount that the payee wants to collect from the payer (step 1). The display screen displayed to the payee, in one embodiment of this case, is illustrated in FIG. 8D. This screen is displayed on the initiation of a collect request (i.e. 'collect from VPA' of FIG. 8B). In the collect from VPA, the user's/payee's VPA is automatically populated as he has already registered. The payee then needs to enter VPA of the payer, amount that is required to be collected, and remarks if any. The payee is also given an option to electronically collect the payment immediately or at a specified time. Once the collect request is submitted, it is validated by a payee's PSPS (106). The validated request is routed to the UPI (100) along with the payee's registered bank details and payer's VPA/unique ID, by the payee's PSPS (106) (step 2). The UPI (100) identifies a payer's PSPS (108) based on the suffix code of the payer's VPA, and sends the collect request to the payer's PSPS (108) (step 3). The payer's PSPS (108) communicates the collect request to the payer via his PSPA tool using a payer's user device (104). The payer receives the collect request and provides authentication details if he agrees to fulfill the collect request, i.e. if he agrees to pay the requested amount to the payee. The payer is authenticated by the payer's PSPS (108) before the transaction by using authentication means (not shown in figures). The authentication means includes UPI PIN, Biometric, IRIS scan, etc. One of the authentication credentials is provided by the payer to continue the transaction. The payer's bank details registered with the payer PSPA tool and the payer's PSPS (108) via the payer's user device (104), is communicated to the UPI (100) server (step 4). The UPI (100) now has bank details of both the payer and the payee based on their VPA's/unique IDs. The UPI (100) uses the bank details to contact the remitter bank (110) (i.e., the payer's bank) and debit the desired amount (step 5 and 6) and then contact the beneficiary bank (112) (i.e., the payee's bank) to credit that amount to complete the transaction (step 7 and 8). After successful transaction, the UPI (100) sends transaction success information, to PSPA tools of the payee (step 9a, 9b, and 10) and the payer, which is accessed by the payee's user device (102) and the payer's user device (104) respectively, wherein the transaction details popup on displays of respective user devices via respective PSPA tools.

Figure 3:
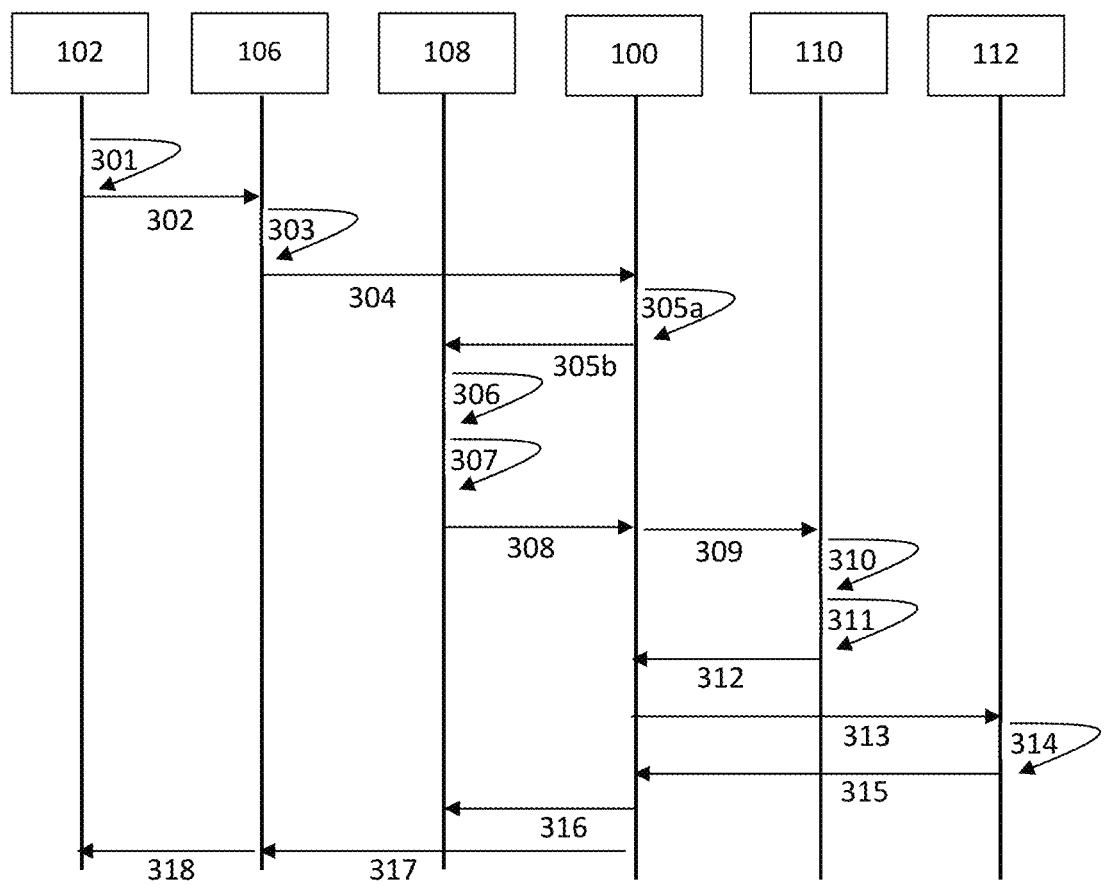
FIG. 3 illustrates a process diagram of payment transaction flow carried out in case of payment collection, with the help of the EPS of FIG. 2A.

Transaction flow for collect/pull request includes the following steps (FIG. 3):

Step 301—Payee initiates transaction through his PSPA tool at the payee's user device (102).

Step 302—The payee's user device (102) initiates the Collect request to the payee's PSPS (106).

Step 303—The Payee's PSPS (106) validates the Payee details and validates the first factor authentication.

Step 304—The payee's PSPS (106) sends the Collect request to the UPI (100).

Step 305—The UPI (100) resolves the payer's address in the following two ways:
  a. If the address has global identifiers (for example, Mobile number, unique ID, account number, etc.) then the PSPS requests the UPI (100) for pending messages via API against a given mobile number or Aadhaar number or Account number and IFSC.
  b. If the Address has virtual address offered by the payer's PSPS (108), then the UPI (100) sends the request to the payer's PSPS (108) for address translation.

Step 306—In case of step 305b, the payer's PSPS (108) sends a notification to the payer who accepts or rejects the request based on the rules set at his end.

Step 307—In case of step 305b, on accepting the Collect request, the payer's PSPS (108) initiates a request to the payer's user device (104) to enter his authentication credentials. Payer provides authentication credentials at the payer's user device (104).

Step 308—In case of step 305b, the payer's PSPS (108) populates the payer details and responds to the UPI (100).

Step 309—the UPI (100) sends the debit request to the debit account provider (110).

Step 310—Account provider authenticates the Payer based on the credential provided.

Step 311—Account provider debits the Payer account.

Step 312—Account provider sends Debit response to the UPI (100).

Step 313—The UPI (100) sends the Credit request to the credit account provider (112).

Step 314—Account provider credits the account based on the Payee details.

Step 315—Account provider sends Credit response to the UPI (100).

Step 316—The UPI (100) sends Confirmation response to the payer's PSPS (108).

Step 317—The UPI (100) sends pay response to payee's PSPS (106).

Step 318—The payee's PSPS (106) notifies the payee.

When a payer wants to send money to a payee (i.e. Push money or Pay transaction or Push request) (FIG. 2B), the payer uses a payer's user device (104) to access and operate a PSPA tool to provide an authorized VPA of the payee along with the amount that the payer wants to send to the payee (step 1). The display screen displayed to the payer, in one embodiment of this case, is illustrated in FIG. 8C. This screen is displayed on the initiation of a push/pay request (i.e. 'pay to VPA' of FIG. 8B). In the pay to VPA, the user's/payer's VPA is automatically populated as he has already registered with the PSPA tool with details of his PSPS. The payer then needs to enter VPA of the payee, amount that is required to be collected, and remarks if any. Once the pay request is submitted, the payer can be authenticated by a payer's PSPS (108) before the transaction, by using authentication means. The authentication means includes UPI PIN, Biometric, IRIS scan, etc. One of the authentication credentials are provided by the payer. The payer's authentication routes to the UPI (100) along with the payer's registered bank details and payee's VPA, via the Payer's PSPS (108) (step 2). The UPI (100) identifies a payee's PSPS (106) based on the suffix code of the payee's VPA, and sends request to the payee's PSPS (106) (step 3). The payee's PSPS (106) authorizes the bank details registered with the payee PSPA tool on the payee's PSPS (106) via the payee's user device (102), and returns the bank details to the UPI (100) server (step 4). The UPI (100) now has bank details of both the payer and the payee based on their VPA's/unique IDs. The UPI (100) uses the bank details to communicate with the remitter bank (110) (i.e., the payer's bank) and debit the desired amount (step 5 and 6) and then communicate with the beneficiary bank (112) (i.e., the payee's bank) to credit that amount to complete the transaction (step 7 and 8). After successful transaction, the UPI (100) sends transaction success information to PSPA tools of the payer (step 9a, 9b and 10) and the payee, which is accessed by the payer's user device (104) and the payee's user device (102) respectively, wherein the transaction details popup on displays of respective user devices via respective PSPA tools.

The UPI (100), at the end of the day when all the financial and non-financial transactions are complete, does the settlement of the all the payment transactions which have taken place between all the PSPSs that are registered with the EPS (1000). In an embodiment, the payer uses a PSPA tool which is different than PSPA tool of the payee. In another embodiment, the payer uses same PSPA tool as that of the payee.

Figure 4:
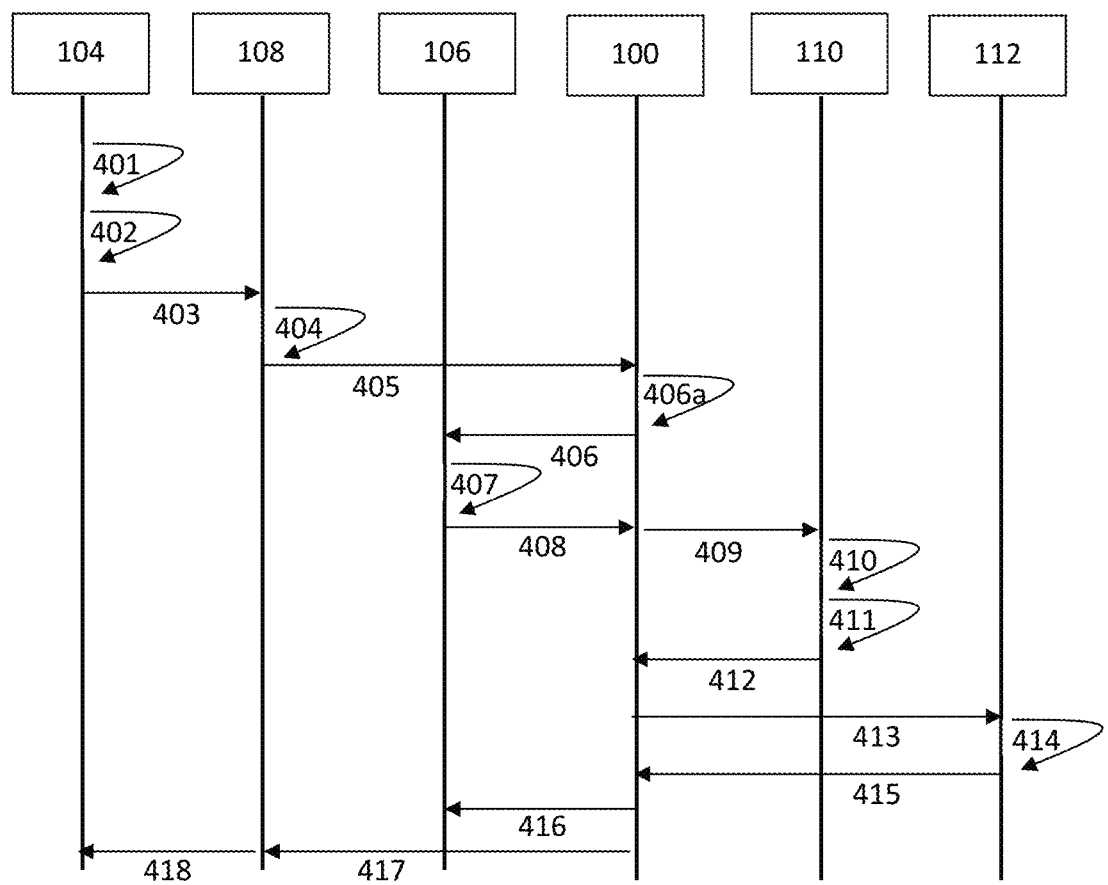
FIG. 4 illustrates a process diagram showing payment transaction flow carried out in case of direct payment, with the help of the EPS of FIG. 2B.

Transaction flow for pay/push request includes the following steps (FIG. 4):

Step 401—Payer initiates transaction through his PSPA tool at the payer's user device (104).

Step 402—The payer provides authentication credentials at the payer's user device (104).

Step 403—The payer's user device (104) initiates the Pay request to the payer's PSPS (108).

Step 404—The payer's PSPS (108) validates the payer details and validates the first factor authentication.

Step 405—The payer's PSPS (108) sends the pay request to the UPI (100).

Step 406—The UPI (100) resolves the payee Address in the following two ways
  a. If the address has global identifiers (for example, Mobile number, unique ID, account number, etc.) then the payee address can be resolved by the UPI (100) central mapper.

b. If the address has virtual address offered by payee's PSPS (106), then the UPI (100) sends the request to the payee's PSPS (106) for address translation.

Step 407—In case of 406b, the payee's PSPS (106) accepts or rejects the request based on the rules set at his end.

Step 408—In case of 406b, on accepting the Pay request, the payee's PSPS (106) populates the payee details and responds to the UPI (100).

Step 409—The UPI (100) sends the debit request to the debit account provider (114).

Step 410—Account provider authenticates the Payer based on the credential provided.

Step 411—Account provider debits the Payer account.

Step 412—Account provider sends Debit response to the UPI (100).

Step 413—The UPI (100) sends the Credit request to the credit account provider (112).

Step 414—Account provider credits the account based on the Payee details.

Step 415—Account provider sends Credit response to the UPI (100).

Step 416—The UPI (100) sends Confirmation response to payee's PSPS (106).

Step 417—The UPI (100) sends pay response to payer's PSPS (108).

Step 418—The payer's PSPS (108) notifies the payer.

Different authentication methods are used by the EPS (1000). In one embodiment, the EPS (1000) uses a 1-click 2-factor authentication method as illustrated in Table 1 below:

TABLE 1

| Authentication | Registration | Authorised by | Transaction | Authorised by |
|---|---|---|---|---|
| 1st Factor | Mobile Device/ Number (outbound encrypted SMS) | PSPS | Device Finger print | PSPS |
| 2nd Factor | OTP | Issuer | UPI PIN or Biometrics | Issuer |

In the embodiment, each PSPS (1004) comprises an authentication module (not shown in the figures) configured to provide 2-factor authentication. The authentication module comprises a first factor authenticator and a second factor authenticator. The first factor authenticator accepts a pre-registered unique number, form a user registered with the PSPS (1004), to validate and associate the registered user with a registered user device (1006) by matching the accepted pre-registered unique number with the registered user's user information data stored in the local storage device (1004a), thereby providing a first factor authentication. The second factor authenticator configured to accept a UPI PIN and/or biometrics input from the registered user to authenticate the registered user by matching the accepted UPI PIN and/or biometrics input with the user information data, thereby providing a second factor authentication.

Referring to the Table-1, for $1^{st}$ Factor authentication, during registering in a PSPA tool, an encrypted SMS is initiated from a user device/mobile of the user, and transmitted to the PSPS to which the user is registered with. The PSPS validates the unique number (mobile number or IMEI etc.) of the user device (this unique number is pre-stored as user information data with the PSPS during user registration), and binds the unique number to the user account. If the customer is registered for mobile banking then he will use his UPI PIN or Biometrics in $2^{nd}$ Factor authentication. If the customer likes to register for mobile banking then he can set a UPI PIN by using last 6 digit of debit card and expiry date of debit card along with the Issuer originated OTP or any other similar suitable process. In subsequent transaction a device finger print can be used for authorization by the PSPS. During a $2^{nd}$ Factor authentication, UPI PIN or biometrics is requested from the user which is authorized by the Issuer in the onward transaction to authenticate the user.

Figure 5:
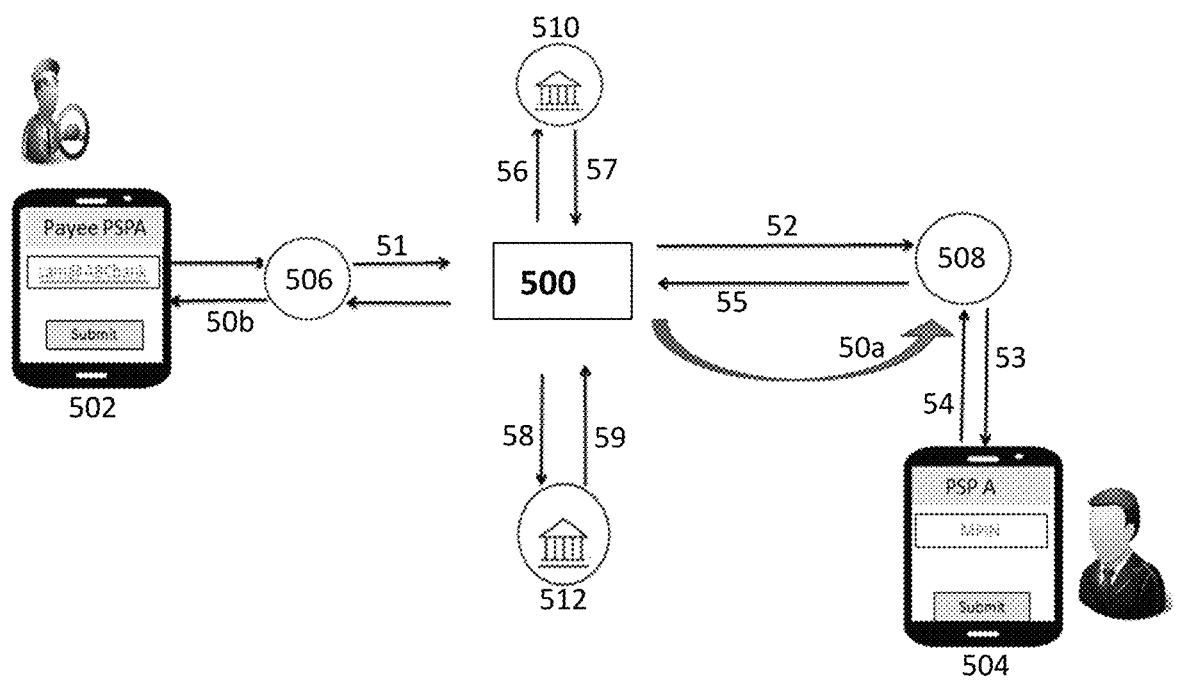
FIG. 5 illustrates a flow diagram showing a payment transaction between a taxi driver and his passenger, with the help of the EPS of FIG. 1.

FIG. 5 of the accompanying drawing illustrates a flow diagram showing a payment transaction between a taxi driver and his passenger. In an exemplary embodiment, the system of the present disclosure is used by a taxi driver to collect fare for the services provided by him to his passenger/customer. When the taxi reaches desired destination, the taxi driver (in this case the payee) can use his user device (502) to pull/collect payment (taxi fare) from the passenger using the system of the present disclosure. The passenger provides his VPA which is inputted by the taxi driver in the payee's PSPA tool along with the collect request on the taxi driver's user device (502). The VPA along with the taxi driver's account details are provided to the UPI (500) by the taxi driver's (payee's) PSPS (506) (step 51). The UPI (500) identifies the passenger's (payer's) PSPS/bank by the VPA and routes the collect request to the passenger's PSPS (508) (step 52). The passenger's PSPS (508) sends notification of the collect request to the passenger's PSPA tool on the passenger's user device (504) (step 53), based on which authentication credentials are provided by the passenger to accept the collect request (step 54). In one embodiment, the authentication is provided by entering UPI PIN using the PSPA tool on the passenger's user device (504). On receipt of the confirmation from the passenger (payee), the passenger's PSPS (508) validates the passenger details and sends financial details to the UPI (500) for debiting the passenger's (payer's) bank account (step 55), The debit request is then sent to the passenger's PSPS/bank (remitter) (510) and the requested amount is debited from the passenger's bank (remitter) (510) (step 56 and 57) by the UPI (500). The UPI (500) then sends credit request to the taxi driver's PSPS/bank (beneficiary) (512) to credit the desired amount (step 58) and receives a credit success message from the taxi driver's PSPS/bank (beneficiary) (512) on successful credit (step 59). The transaction success confirmation is then conveyed by the UPI (500) to the passenger (payer) (step 50a) and the taxi driver (payee) (50b) via their respective PSPA tools.

The EPS (1000) of the present disclosure can be used by a delivery guy (food delivery, apparel delivery etc.) to eliminate the cash on delivery (COD) problems. It provides a one click-two factor authentication wherein a transaction can be authorized by entering only a UPI PIN.

Figure 6:
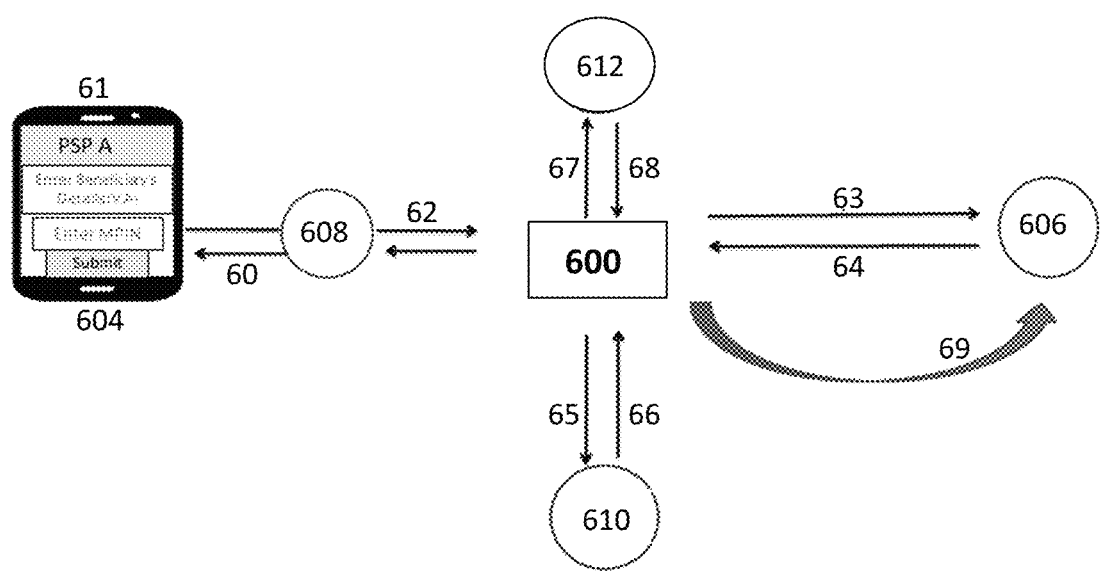
FIG. 6 illustrates a flow diagram showing a remittance payment transaction, with the help of the EPS of FIG. 1.

FIG. 6 illustrates a flow diagram showing a remittance payment transaction, with the help of the EPS (1000), which is used by a sender (payer) to push payment. The sender uses his user device (604) to input a pay request including a receiver's (payee's) VPA and issuing bank UPI PIN along with the amount to be pushed to the receiver's bank (step 61). The sender's account details, UPI PIN and receiver's VPA are then provided to the UPI (600) through the sender's PSPS (608) via his PSPA tool (step 62). The UPI (600) identifies the receiver's (payee's/beneficiary's) handle/PSPS details, and sends the pay request to the receiver's PSPS (606) (step 63). The receiver's PSPS (606) responds with financial address of the beneficiary (i.e. financial address of the payee) (step 64). Based on the response, the UPI (600) sends the sender's (payer's) account details and PIN along with the debit request to the sender's PSPS/bank (610) (step 65) and receives a successful debit response (step 66). On receipt of the debit response, the UPI (600) sends credit request to the receiver's/payee's PSPS/bank (612) (step 67) and receives a successful credit response (step 68). The transaction success confirmation is then sent to the receiver's/payee's PSPS (step 69) and, to the sender via the sender's PSPS (608) and his user device (604) (step 60).

Figure 7:
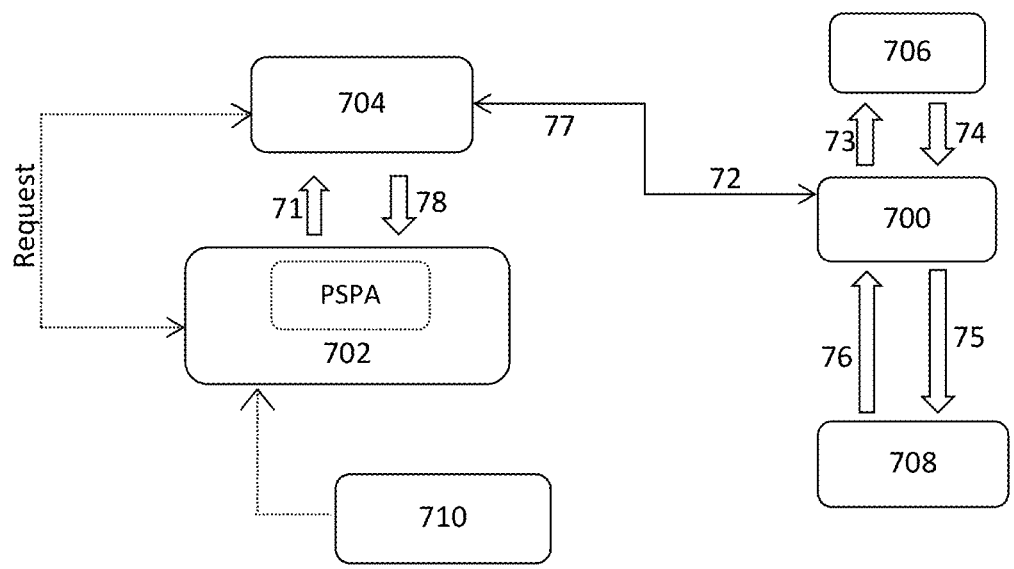
FIG. 7 illustrates a flow diagram showing a three party merchant transaction between a customer and a merchant having same PSPS, in accordance with the embodiment of FIG. 1.

The payer/sender/merchant and the payee/receiver/customer can have same PSPS. FIG. 7 illustrates a flow diagram showing a three party merchant transaction between a customer and a merchant having same PSPS. A customer (710) is registered on the UPI (700) of the system of the present disclosure using a PSPA tool on his user device (702). As the PSPS (704) of customer and merchant is same, virtual addresses of both the merchant and customer are available with the PSPS (704). When a request (push or pull) is made using the PSPA tool the request is sent to the PSPS (704) which is (in this case) common to both the merchant and the customer (step 71). In one embodiment, the request contains a reference ID (user's VPA), amount and a merchant ID. As the virtual addresses are available to the PSPS (704), the financial addresses underlying the virtual addresses are provided to the UPI (700) by the PSPS (704) (step 72). The UPI (700) then sends a debit request to the issuer/payer's PSPS/bank (706) (step 73) and receives a debit response (step 74) based on the push or pull request. The UPI (700) then sends the credit request to the acquirer/payee's PSPS/bank (708) (step 75) and receives a credit success response from the acquirer/payee's PSPS/bank (708) (step 76). The UPI (700) conveys the transaction success to the user through his user device (702) via the PSPS (704) (step 77 and 78).

The present disclosure envisages an electronic payment method for facilitating payment transactions between a plurality of users. The method comprises the following steps:

storing, in a main storage device, a set of pre-determined rules;

processing, by an operating processor, the pre-determined rules to obtain a set of system operating commands;

registering users to a plurality of Payment Service Provider systems (PSPSs) configured to be registered with an electronic payment system (EPS) (1000), each PSPS comprising steps of:

storing, in a local storage device, user information data relating to users registered with the PSPS, facilitating, by at least one look up table, matching data inputted by a customer, a user information data, and a registered user, and providing a PSPS server;

associating each user device of a plurality of user devices with one of the registered users, and registering as a part of user information data;

associating and hosting, each Payment Service Provider Application (PSPA) tool of a plurality of PSPA tools, by a PSPS server of a PSPS registered with the EPS, and having elements which are downloadable and storable in the user device of a registered user irrespective of the fact that the registered user is registered with the PSPS associated with the PSPA tool or not, and further facilitating, by each PSPA tool, generation and receipt of transactional data signals relating to payment requests from the registered users, and credit and/or debit accounts of the registered users based on the requests, the downloadable elements of each PSPA tool comprising steps of:

permitting, by a registering module, registration of a user device with a registered PSPS associated with a PSPA tool in a one to one correspondence, and enabling, by a virtual payment address (VPA) creator module, a registered user to create a unique VPA which includes identification of the PSPS in which the registered user is registered, and further enabling a user device to transmit the unique VPA to the local storage device of the PSPS in which the user is registered, as part of the registered user's user information data;

and facilitating, by a Unified Payment Interface (UPI), registration of a PSPS with the EPS, and controlled movement of transactional data signals selectively between PSPSs to effect payment from one registered user to another registered user in same or different PSPSs, the UPI comprising steps of:

providing a settlement module configured to cooperate with the plurality of PSPSs to periodically collate credit and debit transactions, and generate net credit and debit instructions between the registered PSPSs.

The UPI further comprises the following steps:

receiving, by a receiver, transactional data signals relating to payment requests from the registered user devices via any of the PSPA tools, each request comprising a VPA of a first registered user, a VPA of a second registered user, and a transaction amount;

parsing, by a parser, the transactional data signals to obtain parsed signals, extracting and identifying from the parsed signals, by an extractor identifier, information relating to the PSPS of the first registered user and the PSPS of the second registered user, transmitting, by a transmitter, the transactional data signals to the identified respective PSPSs, to facilitate credit from or debit to an account of the first registered user to or from an account of the second registered user, selectively based on content of the parsed data signals.

Each PSPS further comprises step of providing 2-factor authentication, by an authentication module. The step of providing 2-factor authentication comprises the following steps:

accepting, by a first factor authenticator, a pre-registered unique number form a user registered with the PSPS, to validate and associate the registered user with a registered user device, by matching the accepted pre-registered unique number with the registered user's user information data stored in the local storage device, thereby providing a first factor authentication, and accepting, by a second factor authenticator, a UPI PIN and/or biometrics input from the registered user to authenticate the registered user by matching the accepted UPI PIN and/or biometrics input with the user information data, thereby providing a second factor authentication.

Even if the customer and the merchant are using same PSPS, both of them can have multiple different PSPA tools on their respective user devices. In an example, a PSPS Software Development Kit (SDK) is embedded into the merchant's PSPA tool and different PSPA tools are available to the customer. In such a case, when the merchant raises an intent/request, all the UPI PSPA tools on the customer's user device are displayed for the customer to select a PSPA tool which is same as that of the merchant. As illustrated in FIG. 7, in this example also, the virtual addresses of both the merchant and the customer are available with the PSPS and the transaction takes place in a similar way and described earlier.

The EPS (1000) envisaged in the present disclosure can be used by Physical Stores/Merchants to make transactions including Vegetable Vendor Payment, Grocery store Payments, Payment for Taxi/auto/Bus/Train/Air fares, Payment in restaurants/shops/petrol pumps, Fee Payment to various educational institutes, Toll plaza payment while travelling, Payment to milk vendor/newspaper vendor, Trust/Temple/relief fund/NGO donation, Payment at the Mall, and the like. The EPS (1000) can also be used to make utility payments including payment for various bills like electricity, water, telephone, credit card etc., apartment maintenance fee bill presentment and payments, school fee bill presentment and payment, insurance premium payment, installment payment of loan, car loan EMI payment, and the like.

Further, online merchants can also use the EPS (1000) for E-commerce transactions including COD Payments, In-App payments, online trading, mobile recharge from newspaper advertisement using 'Scan N Pay', E-commerce (Collection/Pull)—Payment through UPI after Checkout, booking the movie tickets and the like. Furthermore, it can also be used in Peer to Peer transactions for remittance (Both Push & Pull), payment to person/friends, sharing of bills with friends, salary payment to driver, Aadhaar/mobile number based inward remittance to another bank account.

TECHNICAL ADVANCEMENTS

The present disclosure described herein above has several technical advantages including, but not limited to, the realization of an electronic payment system that:
- facilitates sending and receiving money in a simpler manner using user devices;
- provides a unified payments interface (UPI);
- enables a user to pull/collect payments from accounts of concerned persons/entities;
- is simple to use for both, the payers and the payees;
- enables payment transactions between a payer and a payee without mandatorily needing the bank information and bank account details of each other;
- enables a user to send and receive money with the help of a virtual payment address;
- provides secure payments based on single/unique identifier;
- eliminates the risk of storing customer's virtual address like in cards;
- can be used by customers which do not have credit/debit cards;
- is suitable for e-Com & m-Com;
- resolves the COD collection problem;
- provides In-App Payments (IAP);
- provides privacy by sharing only Virtual Address and no other sensitive information;
- facilitates Multiple Utility-Cash on delivery/bill split sharing/merchant payments/remittances;
- authorizes transaction by entering only a UPI PIN or Biometric or UID or iris or other means; and
- works across various interfaces, where payment request can be generated on a Web interface and authorized on a Mobile interface (App).

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. An electronic payment system (EPS) (1000) for facilitating payment transactions between a plurality of users, said system comprising:
   a plurality of Payment Service Provider systems (PSPSs) configured to register users and further configured to be registered with said EPS (1000), each PSPS (1004) comprising:
      a local storage device (1004a) configured to store user information data relating to users registered with said PSPS (1004),
      at least one look up table (1004b) configured to facilitate matching data inputted by a customer, a user information data, and a registered user, and
      a PSPS server (1004c);
   a plurality of user devices, each user device (1006) associated with one of said registered users and registered as a part of user information data;
   Payment Service Provider Application (PSPA) tools, each PSPA tool (1008) associated with and hosted by a PSPS server (1004c) of a PSPS (1004) registered with said EPS (1000), and having elements which are downloadable and storable in the user device (1006) of a registered user, each PSPA tool (1008) configured to enable the registered user to transmit or receive payment requests regardless of whether or not the registered user has a bank account with the PSPS associated with said PSPA tool (1008), each PSPA tool (1008) configured to facilitate generation and receipt of transactional data signals relating to said payment requests from said registered users, and credit and/or debit accounts of said registered users based on said requests, said downloadable elements of each PSPA tool (1008) comprising:
      a registering module (1008a) configured to permit registration of a user device (1006) with a registered PSPS (1004) associated with a PSPA tool (1008) in a one to one correspondence, and
      a virtual payment address (VPA) creator module (1008b) configured to enable a registered user to create a unique VPA which includes identification of the PSPS in which the registered user is registered, and further enable a user device (1006) to transmit said unique VPA to the local storage device (1004a)

of the PSPS (1004) in which the user is registered, as part of the registered user's user information data;
a Unified Payment Interface (UPI) (100) configured to facilitate registration of a PSPS (1004) with said EPS (1000), and further configured to facilitate controlled movement of transactional data signals selectively between PSPSs, to effect payment from one registered user to another registered user in same or different PSPSs, said UPI (100) comprising:
a settlement module (100*a*) configured to cooperate with said plurality of PSPSs to periodically collate credit and debit transactions, and generate net credit and debit instructions between said registered PSPSs,
a main storage device (1002*a*) configured to store a set of pre-determined rules, wherein said set of pre-determined rules are related to electronic payment transactions, and transmitting and receiving payment requests; and
an operating processor (1002*b*) configured to cooperate with said main storage device (1002*a*) to receive and process said set of pre-determined rules to obtain a set of system operating commands for operating said modules.

2. The EPS (1000) as claimed in claim 1, wherein said UPI (100) further comprises:
a receiver (100*b*) configured to receive transactional data signals relating to payment requests from the registered user devices via any of the PSPA tools, each request comprising a VPA of a first registered user, a VPA of a second registered user, and a transaction amount;
a parser (100*c*) configured to parse said transactional data signals to obtain parsed signals;
an extractor identifier (100*d*) configured to extract and identify, from the parsed signals, information relating to the PSPS of the first registered user and the PSPS of the second registered user; and
a transmitter (100*e*) configured to transmit said transactional data signals to the identified respective PSPSs, to facilitate credit from or debit to an account of the first registered user to or from an account of the second registered user, selectively based on content of the parsed data signals.

3. The EPS (1000) as claimed in claim 1, wherein each PSPS (1004) further comprises an authentication module configured to provide 2-factor authentication, said authentication module comprising:
a first factor authenticator configured to accept a pre-registered unique number, form a user registered with said PSPS (1004), to validate and associate the registered user with a registered user device (1006) by matching the accepted pre-registered unique number with the registered user's user information data stored in said local storage device (1004*a*), thereby providing a first factor authentication, and
a second factor authenticator configured to accept a UPI PIN and/or biometrics input from the registered user to authenticate the registered user by matching the accepted PIN and/or biometrics input with said user information data, thereby providing a second factor authentication.

4. The EPS (1000) as claimed in claim 2, wherein said UPI (100) further comprises a transaction server for processing the transactional data signals, an authorization server for user authorization, and a UPI server to process a stored set of rules for identifying registered PSPSs.

5. The EPS (1000) as claimed in claim 1, wherein each of the plurality of PSPSs represents a different financial institution; and wherein the UPI is configured to enable the registered user to select to transfer money to or receive money from another party using the PSPA of any of a number of different financial institutions regardless of whether or not the user has a personal bank account with the financial institution providing the PSPA tool.

6. An electronic payment method for facilitating payment transactions between a plurality of users, said method comprising the following steps:
registering users to a plurality of Payment Service Provider systems (PSPSs) configured to be registered with an electronic payment system (EPS) (1000), each PSPS comprising steps of:
storing, in a local storage device, user information data relating to users registered with said PSPS,
facilitating, by at least one look up table, matching data inputted by a customer, a user information data, and a registered user, and
providing a PSPS server;
associating each user device of a plurality of user devices with one of said registered users, and registering as a part of user information data;
associating and hosting, each Payment Service Provider Application (PSPA) tool of a plurality of PSPA tools, by a PSPS server of a PSPS registered with said EPS, said PSPA tools having elements which are downloadable and storable in the user device of a registered user, each PSPA tool configured for enabling the registered user to transmit or receive payment requests regardless of whether or not the registered user has a bank account with the PSPS associated with said PSPA tool, and further facilitating generation and receipt of transactional data signals relating to said payment requests from said registered users, and credit and/or debit accounts of said registered users based on said requests, said downloadable elements of each PSPA tool comprising steps of:
permitting, by a registering module, registration of a user device with a registered PSPS associated with a PSPA tool in a one to one correspondence, and
enabling, by a virtual payment address (VPA) creator module, a registered user to create a unique VPA which includes identification of the PSPS in which the registered user is registered, and further enabling a user device to transmit said unique VPA to the local storage device of the PSPS in which the user is registered, as part of the registered user's user information data;
facilitating, by a Unified Payment Interface (UPI), registration of a PSPS with said EPS, and controlled movement of transactional data signals selectively between PSPSs to effect payment from one registered user to another registered user in same or different PSPSs, said UPI comprising steps of:
providing a settlement module configured to cooperate with said plurality of PSPSs to periodically collate credit and debit transactions, and generate net credit and debit instructions between said registered PSPSs,
storing, in a main storage device, a set of pre-determined rules, wherein said set of pre-determined rules are related to electronic payment transactions, and transmitting and receiving payment requests; and processing, by an operating processor, said pre-determined rules to obtain a set of system operating commands for operating said modules.

7. The method as claimed in claim 6, wherein said UPI further comprises the following:
- receiving, by a receiver, transactional data signals relating to payment requests from the registered user devices via any of the PSPA tools, each request comprising a VPA of a first registered user, a VPA of a second registered user, and a transaction amount;
- parsing, by a parser, said transactional data signals to obtain parsed signals,
- extracting and identifying from the parsed signals, by an extractor identifier, information relating to the PSPS of the first registered user and the PSPS of the second registered user,
- transmitting, by a transmitter, said transactional data signals to the identified respective PSPSs, to facilitate credit from or debit to an account of the first registered user to or from an account of the second registered user, selectively based on content of the parsed data signals.

8. The method as claimed in claim 6, wherein each PSPS further comprises the following:
- providing 2-factor authentication, by an authentication module, said step of providing 2-factor authentication comprises the following steps:
- accepting, by a first factor authenticator, a pre-registered unique number form a user registered with said PSPS, to validate and associate the registered user with a registered user device, by matching the accepted pre-registered unique number with the registered user's user information data stored in said local storage device, thereby providing a first factor authentication, and
- accepting, by a second factor authenticator, a PIN and/or biometrics input from the registered user to authenticate the registered user by matching the accepted PIN and/or biometrics input with said user information data, thereby providing a second factor authentication.

* * * * *